(12) United States Patent
Wolf et al.

(10) Patent No.: US 12,203,749 B2
(45) Date of Patent: Jan. 21, 2025

(54) CHAIN ELONGATION MONITORING DEVICE AND METHOD FOR DETERMINING WEAR

(71) Applicant: iwis antriebssysteme Gmbh & Co. KG, Munich (DE)

(72) Inventors: Thomas Wolf, Erdweg (DE); Josef Siraky, Donaueschingen (DE)

(*) Notice: Subject to any disclaimer, the term of this patent is extended or adjusted under 35 U.S.C. 154(b) by 373 days.

(21) Appl. No.: 17/705,718

(22) Filed: Mar. 28, 2022

(65) Prior Publication Data

US 2022/0307814 A1 Sep. 29, 2022

(30) Foreign Application Priority Data

Mar. 29, 2021 (DE) .................. 10 2021 107 898.9

(51) Int. Cl.
*G01B 7/04* (2006.01)
*G01B 7/02* (2006.01)
*G01M 13/023* (2019.01)

(52) U.S. Cl.
CPC ............. *G01B 7/046* (2013.01); *G01B 7/026* (2013.01); *G01M 13/023* (2013.01)

(58) Field of Classification Search
CPC ........................ G01D 5/2033; G01D 5/2241
See application file for complete search history.

(56) References Cited

U.S. PATENT DOCUMENTS

| 5,291,131 | A | 3/1994 | Suzuki et al. |
| 7,540,374 | B2 | 6/2009 | Rathbun et al. |
| 2008/0047804 | A1* | 2/2008 | Rathbun ............... B65G 43/02 198/502.1 |
| 2019/0062067 | A1* | 2/2019 | Kreisfeld ............. G01B 11/043 |

FOREIGN PATENT DOCUMENTS

| DE | 102013221110 | 4/2015 |
| DE | 102017121706 | 3/2019 |
| DE | 102018201816 | 8/2019 |
| EP | 1464919 | 10/2004 |

* cited by examiner

*Primary Examiner* — Tung X Nguyen
(74) *Attorney, Agent, or Firm* — JMB DAVIS BEN-DAVID

(57) ABSTRACT

The invention relates to a chain elongation monitoring device having a first differential transformer, a second differential transformer, and a control for recording the measured values, wherein the second differential transformer is arranged at a fixed distance from the first differential transformer, and a method for operating the chain elongation monitoring device.

29 Claims, 9 Drawing Sheets

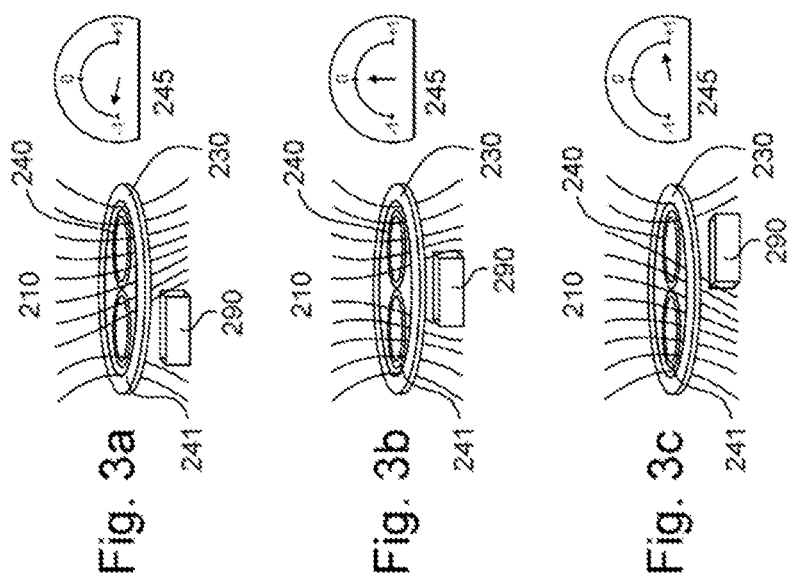

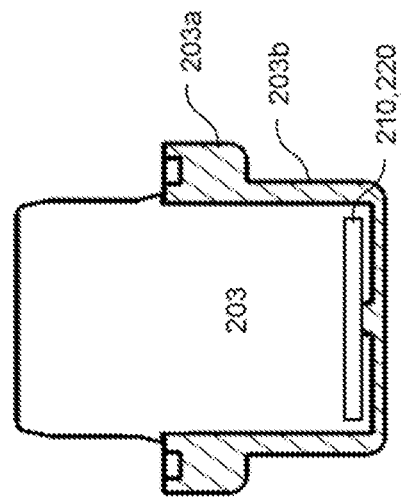
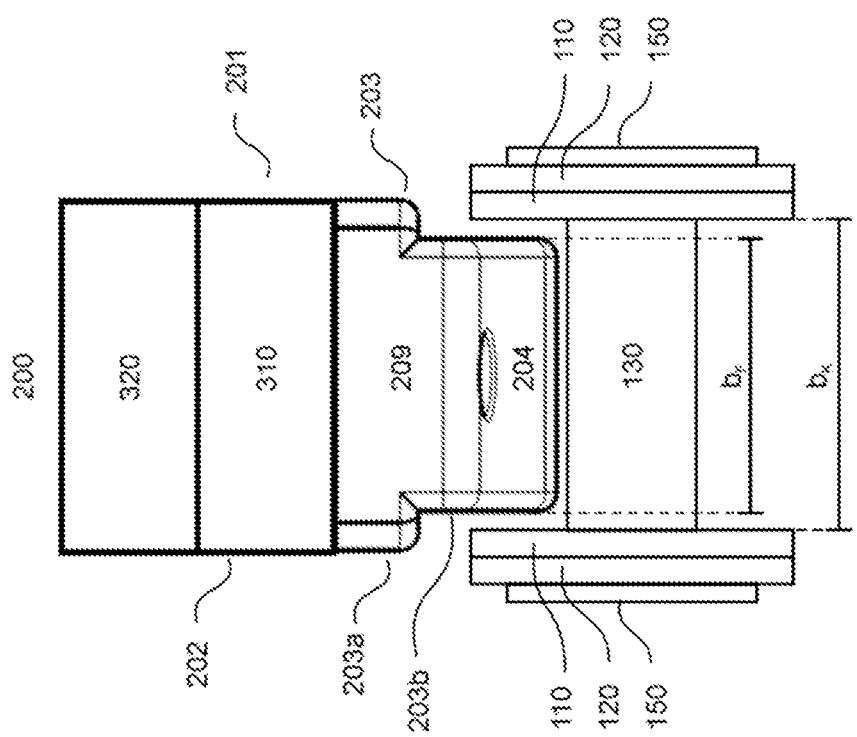

CHAIN ELONGATION MONITORING DEVICE AND METHOD FOR DETERMINING WEAR

CROSS-REFERENCE TO RELATED APPLICATIONS

Benefit is claimed to German patent application No. 10 2021 107 898.9, filed on Mar. 29, 2021, the contents of which are incorporated by reference herein in their entirety.

FIELD

The invention relates to a chain elongation monitoring device having a first differential transformer, a second differential transformer, and a control for recording the measured values, as well as a method for operating the chain elongation monitoring device.

BACKGROUND

Chain drives are used in a variety of industrial applications for drive or transport purposes. Multiple strands of chain are often used. In addition to a typically endlessly circulating chain, a complete chain drive includes multiple sprockets that are used to deflect the chain, as well as drive or transport elements that are connected to the chain and are actuated by the chain. A chain is subject to wear during operation due to the abrasion of parts in the chain link that are movable in relation to one another. Further factors, such as elongation during running in of the chain, stretching, bearing play, and bearing abrasion, can also result in elongation of the chain and ultimately also in the failure of the drive unit. Other influencing factors on the wear of a chain are also the forces that act on the chain and loads, or also external influences determined by the environment. Due to the complexity of these relationships, it is not possible to predict the wear of the chain and thus a possible disruption in the operational cycle or even the failure of the drive unit.

Complex chain drives are increasingly being used due to the constantly increasing number of fully automated machines and facilities, since they are necessary for modern factory automation. As a result of the high investment costs for such a high degree of automation and the global price pressure, it is necessary to reduce the downtimes of the machines and facilities to an absolute minimum and to completely prevent unplanned downtimes.

In addition to direct financial losses, such unplanned downtimes also result in indirect problems, for example, the disruption of the logistics chain or delivery times that cannot be met, and thus in further financial losses. However, even a small amount of wear can have the result that cycles synchronized by chain drives result in production failures and must be manually readjusted. Since the wear of a drive chain or also its elongation cannot be avoided and cannot be reliably predetermined, continuous monitoring of a chain drive is essential in order to be able to carry out timely inspections to adjust the synchronized cycles and replace defective chains.

U.S. Pat. No. 5,291,131 describes a suitable method for monitoring the elongation of a circulating drive chain. In this method, two markings spaced apart in the longitudinal direction of the chain are provided on the drive chain, the position of which is detected during operation by two inductive or optical sensors, which are also arranged at a distance from one another. The circulation speed of the chain and the chain elongation in the chain segment between the spaced-apart markings can be determined from the measured values of the two sensors via a connected data detection system. Statements about the other regions of the chain or in small segments of the chain are not possible using this method.

A similar method for monitoring the wear of a drive chain is described in document EP 1 464 919 A1. Two markers made of a magnetic material are also attached to opposite sides of the chain here. Two inductive sensors provided next to the chain generate an electrical signal when passing the magnetic sensors. The sensors are arranged at a distance from one another on opposite sides of the drive chain, so that initially the sensors are triggered simultaneously. As soon as the wear elongation of the chain causes a time delay between the triggering of the sensors, the wear elongation of the chain can be determined via a position shift of the sensors. As in the case described above, the circulation speed of the chain and the chain elongation in the chain segment between the spaced-apart markers can be determined here from the measured values of the two sensors. Statements about the other regions of the chain or in small segments of the chain are also not possible using this method.

U.S. Pat. No. 7,540,374 B2 describes another device for measuring the wear elongation of a drive chain by means of two optical sensors. The first sensor detects the first chain link of a chain portion, and a second sensor determines the position and the distance of the second chain link. Furthermore, the distance of multiple chain portions can also be determined at two measuring positions that are spaced apart from one another.

Furthermore, determining the wear of a drive chain by measuring the force, the path, or the rotational angle of chain tensioners or two rotational angle sensors on the drive wheel and on the load, wheel is known from the prior art. However, a chain tensioner is not needed everywhere, and rotation angle sensors are also not usable everywhere. In addition, these are then influenced by the wear or the chain elongation. However, such methods must be precisely matched to the specific method since the measurement in these cases depends on the total chain length and on the wear of the sprockets. The adjustment is very time-consuming and failure prone. Therefore, these methods are not generically applicable.

Depending on the sensors used and the measuring principle, the mentioned devices and methods known from the prior art have an array of different disadvantages.

Conventional measuring systems require a drive at a constant speed for accurate measurement of the chain elongation and react with measurement failures to irregularities in the drive system, for example a relative slip between the drive wheel and drive chain or the wear of the sprockets.

However, what all previously known devices and methods have in common is in particular that the elongation of the chain cannot be attributed to the elongation of individual chain segments. If an elongation is detected, this means that the entire chain always must be replaced, which is associated with significantly higher costs. This also has the consequence that the previously specified limiting values also had to take into account singularities in the chain elongation until the chain was replaced, and so significantly lower limiting values are required than if the elongation of individual chain segments or even chain links were known. Although individual devices and methods already allow measurements of values that also allow an elongation for chain segments, these values cannot be assigned to individual chain segments observed during a measurement, so that this again results in the complete replacement of the chain.

It is therefore the object of the invention to provide a chain elongation monitoring device, through which failure states of the monitored chain are detected reliably and quickly, the elongation of each individual chain segment is determined, the monitored chain does not have to have a minimum speed, and the elongation of the chain can also be statistically detected over a longer period of time. The invention is also based on the object of providing a method for determining the elongation of segments of a chain, through which failure states of the monitored chain can be detected reliably and quickly, the elongation of each individual chain segment is determined, the monitored chain does not have to have a minimum speed, and the elongation of the chain can also be statistically detected over a longer period of time.

The object is achieved by the chain elongation monitoring device as claimed in claim 1. Further advantageous embodiments of the invention are set forth in the dependent claims.

SUMMARY

The chain elongation monitoring device according to the invention has a first differential transformer and a second differential transformer. According to the invention, the two differential transformers are at a fixed distance from one another. Each of the two differential transformers simultaneously picks up a signal from different chain components of the chain to be monitored. The chain elongation monitoring device additionally has a control for recording measured values. The control determines the position of the signals of the chain components and determines the position of the chain components. The distance of the two chain components from one another is determined from the position of the chain components. The chain elongation monitoring device according to the invention is designed in such a way that the position of the first chain component and the position of the second chain component are determined simultaneously and continuously. Therefore, failure states of the monitored chain can be detected quickly and reliably, and the elongation of the chain can also be statistically detected over a longer period of time.

In an optional embodiment of the invention, the first and/or the second differential transformer of the chain elongation monitoring device is provided and suitable for detecting the measured values for determining the position of chain components independently of the speed and/or the position of the chain to be monitored. In an optional embodiment, the first and/or the second differential transformer are suitable for detecting the measured values for determining the position of the chain components when the chain speed is 0. In further embodiments of the invention, the measured values for determining the position of a chain component can be detected at any time.

In a further embodiment of the invention, the length of the first differential transformer and/or the second differential transformer corresponds at least to the distance between the two differential transformers. The length of the differential transformers is specified in the movement direction of the chain to be monitored. Each differential transformer generates a magnetic field that can impair the function of the respective other differential transformer if the distance between the differential transformers is too small. It has been found that a distance of the differential transformers from one another that corresponds at least to the length of a differential transformer is sufficient to eliminate the impairments.

In a further embodiment of the invention, the chain elongation monitoring device has a circuit board having a control unit. The circuit board having the control unit is a standard component and is therefore producible inexpensively and is easy to implement in the chain elongation monitoring device.

In a further advantageous embodiment of the invention, the chain elongation monitoring device has a further position detection sensor in addition to the first and the second differential transformer. The position of a further chain component is determined by means of the second position detection sensor.

In a development of the invention, the additional position detection sensor is based on a different technology than the two differential transformers. The position detection sensor is advantageously designed as an analog Hall sensor that is used as a proximity switch.

In a further embodiment of the invention, the additional position detection sensor has a lower resolution than the two differential transformers. The position detection sensor is typically designed as an analog Hall sensor that is used as a proximity switch. The signal of the Hall sensor is converted into a yes/no signal via a comparator of the control unit. The position detection sensor therefore only detects whether a magnetic object is being guided past the position detection sensor.

In a further embodiment of the invention, the additional position detection sensor is arranged in the movement direction of the chain to be monitored between the first and the second differential transformer. The position detection sensor is thus advantageously also arranged within the chain length monitoring device and only takes up little space.

In a further embodiment of the invention, the additional position detection sensor is arranged directly on a circuit board. The position detection sensor is therefore advantageously also arranged within the chain length monitoring device and only takes up little space.

In a development of the invention, the distance between the position detection sensor and the differential transformer corresponds at least to the length of a differential transformer. The differential transformer generates a magnetic field that also varies. The magnetic field can impair the functioning of the position detection sensor. It has been found that a distance between the position detection sensor and the differential transformer which corresponds to at least the length of a differential transformer is sufficient to minimize such interference of the position detection sensor.

In a further embodiment of the invention, the components of the chain elongation monitoring device (first differential transformer, second differential transformer, additional position detection sensor, control unit) are arranged in a housing. The housing protects the components from soiling such as dust or liquids, and simultaneously the chain length monitoring device is arrangeable as a component on the chain to be monitored.

In an optional development of the invention, the first and/or the second differential transformer are suitable for detecting the measured values for determining the position of a chain component simultaneously over the path length range of the chain.

In a development of the invention, the chain elongation monitoring device is suitable and provided for detecting the measured values from the first and/or the second differential transformer simultaneously over a length range of the chain. The length range of the chain extends in the movement direction of the chain.

In a further embodiment of the invention, the length range is greater than or equal to half the length of a chain link, preferably greater than or equal to ¾ of the length of a chain link, and particularly preferably greater than the length of a chain link. The length of a chain link results from the defined standard according to a standard chain according to British Standard (DIN 8188) or ANSI Standard (DIN 8187).

In a further embodiment according to the invention, the first and/or the second differential transformer have at least two sensor elements forming the first and/or the second differential transformer. These are the primary coil and the secondary coils of the differential transformer, which are arranged along the chain movement direction. The distance between the at least two sensor elements is limited for this purpose to a length of less than twice a chain link of the chain to be monitored. The length of a chain link results from the defined standard according to a standard chain according to British Standard (DIN 8188) or ANSI Standard (DIN 8187).

In a further embodiment of the invention, the chain elongation monitoring device has a first guide surface. The guide surface is aligned essentially parallel to the chain to be monitored and in particular protects the differential transformers and the position detection sensor from mechanical damage due to the moving chain.

In an advantageous embodiment of the invention, the length LF of the first guide surface is greater than the length of one of the differential transformers, preferably longer than the sum of the lengths of both differential transformers, and particularly preferably greater than three times the length of one of the two differential transformers. This ensures that the chain to be monitored, in the region of the chain elongation monitoring device, runs essentially parallel to the chain elongation monitoring device and the differential transformers have an equal distance to the chain components.

In a further embodiment of the invention, a first phase surface adjoins the first end of the first guide surface in the chain running direction. The first phase surface has an angle in relation to the guide surface and is in front of or behind the guide surface in the running direction of the chain. The first phase surface directs the chain to be monitored in such a way that it runs essentially parallel to the chain elongation monitoring device in the region of the chain elongation monitoring device.

In a development of the invention, a second phase surface adjoins the second end of the first guide surface in the chain running direction. The second phase surface has an angle in relation to the guide surface and is behind or in front of the guide surface in the running direction of the chain. The second phase surface directs the chain to be monitored in such a way that it runs essentially parallel to the chain elongation monitoring device in the region of the chain elongation monitoring device.

In a further embodiment of the invention, the chain elongation monitoring device has a guide element.

In a development of the invention, a guide element is arranged on the opposite side of the chain from the first guide surface.

In a further embodiment of the invention, the guide element has a second guide surface.

In a further embodiment according to the invention, the chain elongation monitoring device is divided into an upper housing part and a lower housing part. The upper housing part accommodates the connections and the circuit board. The sensor elements are arranged in the lower housing part and the guide surface is arranged on its lower side. The sensor elements are arranged far enough into the lower part of the lower housing part that their upper edge is still below half the height of the lower housing part. The lower housing part in turn has the fastening elements for fastening the lower housing part to the upper housing part in its upper region, while the lower region of the lower housing part is used to accommodate the sensor elements or differential transformers. Furthermore, the guide surface is arranged on the lower side of the lower housing part. The width of the upper region of the lower housing part is preferably equal to the width of the upper housing part, while the lower region of the lower housing part has a smaller width than that of the upper region of the lower housing part or the upper housing part.

In a further embodiment of the invention, the length LF2 of the second guide surface is greater than the length of one of the differential transformers, preferably longer than the sum of the lengths of both differential transformers, and particularly preferably greater than three times the length of one of the two differential transformers.

The object is also achieved by the method for determining the elongation of segments of a chain. Further advantageous embodiments of the invention are set forth in the dependent claims.

The method according to the invention for determining the elongation of segments of a chain comprises five steps: In the first step, a first signal is detected from a first differential transformer. In the second step, the position of a first chain component of a chain is determined from the first signal. In the third step, a second signal is detected from a second differential transformer. In the fourth step, the position of a second chain component of a chain is determined from the second signal. In the fifth step, the distance between the first and the second chain component is determined.

Due to the occurrence of wear, the determined distance of the chain components from one another increases with the operating time of the chain. The position determination of the first and second chain component advantageously takes place synchronously and continuously. Therefore, failure states of the monitored chain can be detected quickly and reliably, and the elongation of the chain can also be statistically detected over a longer period of time.

The differential transformers are particularly suitable for detecting the measured values for determining the position of the chain components independently of the speed and/or the position of the chain to be monitored. In an optional embodiment, the differential transformers are suitable for detecting the measured values for determining the position of the chain components when the chain speed is 0. In a further embodiment of the invention, the measured values for determining the position of a chain component can be detected at any time.

In a development of the invention, the measured values from the first and the second differential transformer are detected simultaneously over a length range of the chain. The length range of the chain extends in the direction of the movement direction of the chain. The first and the second differential transformer are provided and suitable for the purpose of simultaneously detecting measured values over a length range of the chain.

In a further embodiment of the invention, the length range is greater than or equal to half the length of a chain link, preferably greater than or equal to ¾ of the length of a chain link, and particularly preferably greater than the length of a chain link. The length of a chain link results from the defined standard according to a standard chain according to British Standard (DIN 8188) or ANSI Standard (DIN 8187).

In a further embodiment according to the invention, the measured values are detected by at least two sensor elements that make up the differential transformer. These are a primary coil and one or more secondary coils of the differential transformer, which are arranged along the chain movement direction. The distance between the at least two sensor elements is limited for this purpose to a length of less than twice a chain link of the chain to be monitored. The length of a chain link results from the defined standard according to a standard chain according to British Standard (DIN 8188) or ANSI Standard (DIN 8187).

In a further embodiment of the invention, the first signal and the second signal are detected simultaneously. The determination of the distance of the chain components to one another is also executed simultaneously. In addition, the first and second measurements and the determination of the distance of the chain components to one another are advantageously carried out continuously. Therefore, failure states of the monitored chain can be detected quickly and reliably, and the elongation of the chain can also be statistically detected over a longer period of time.

In a further embodiment of the invention, the first differential transformer and the second differential transformer have a known distance to one another. The differential transformers have a defined distance to one another, which corresponds to the pitch or an integer multiple of the pitch of the chain to be monitored in new condition. The distance of the two differential transformers to one another is a parameter for calculating the length value of the chain. The length value, like the distance of the chain components to one another, is continuously determined and takes place simultaneously.

In a further embodiment of the invention, the detected chain components are standard chain components. Additional add-on parts on the chain are not necessary for using the method according to the invention, so there are no additional costs.

In a development of the invention, the detected chain components are the pins and/or the sleeves of the chain. The chain components are usually chain sleeves or chain pins guided in the chain sleeve. Additional components are not necessary for using the method according to the invention.

In a further embodiment of the invention, all structurally identical chain components of the detected chain components that are guided past a differential transformer are detected. The chain components are detected continuously by determining the positions of all structurally identical standard chain components as and when they are detected by the differential transformer. It is therefore possible to determine the elongation of individual chain segments in particular. The number of segments depends on the length of the chain to be monitored. In the ideal case, the number of segments corresponds to the number of the chain links of the chain to be monitored, so that each individual chain link is monitored with regard to its elongation.

In a further embodiment of the invention, the first measured value and the second measured value are detected simultaneously.

In a further embodiment of the invention, the length between the first chain component and the equivalent/structurally identical chain component directly adjacent to the first chain component is determined from the first signal and the second signal. Due to the continuous determination of the positions of chain components, it is possible to determine the elongation of chain sections and segments. The chain segments can also be designed in such a way that distances of directly adjacent chain components to one another can be determined. This makes it possible to replace individual chain links, especially in the event of maintenance; it is not necessary to replace the entire chain.

In a further embodiment of the invention, the position of the first chain component is determined exclusively from the measured values detected by the first differential transformer and/or the position of the second chain component is determined exclusively from the measured values detected by the second differential transformer. Each of the two differential transformers thus determines the position of one (a total of two) chain components simultaneously. The distance of the two chain components to one another is determined from the position.

Exemplary embodiments of the method according to the invention for determining the elongation of segments of a chain and of the chain elongation monitoring device according to the invention are shown schematically in simplified form in the drawings and are explained in more detail in the following description.

BRIEF DESCRIPTION OF THE DRAWINGS

In the figures:

FIG. 8a: shows a sectional view in the longitudinal direction of the chain elongation monitoring device according to the invention FIG. 8b: shows another sectional view in the longitudinal direction of an exemplary embodiment of the chain elongation monitoring device according to the invention

DETAILED DESCRIPTION

Figure 1:
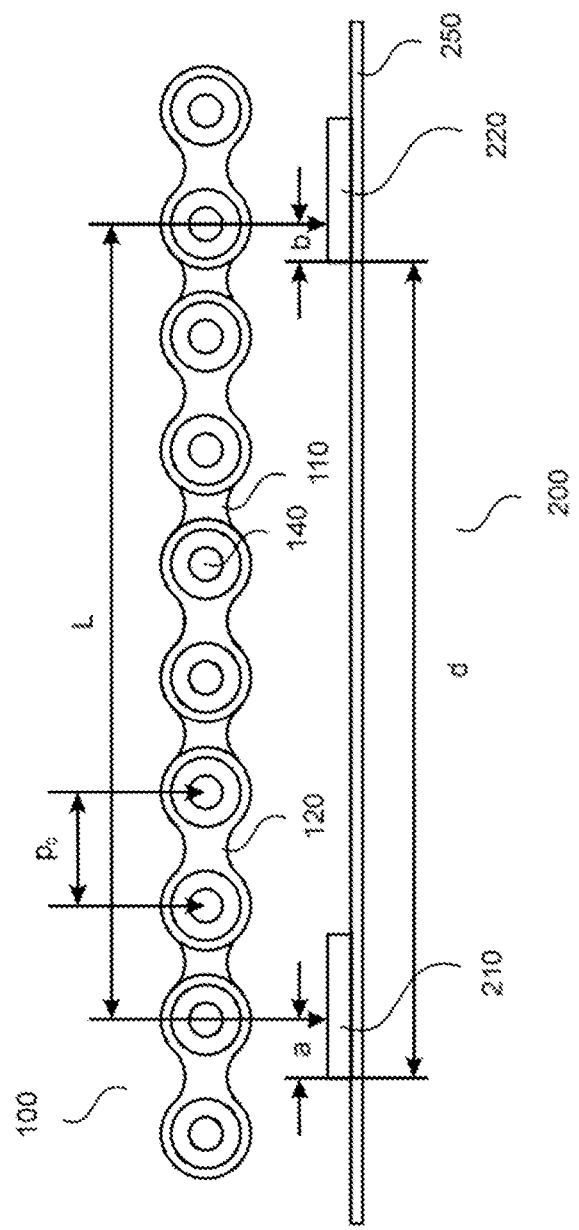
FIG. 1 shows a chain elongation monitoring device according to the invention

FIG. 1 shows the chain elongation monitoring device 200 according to the invention for determining the elongation of segments of a chain 100. The chain 100 to be monitored is designed as a roller chain in this and the following exemplary embodiments and has alternating inner 110 and outer side parts 120, which are connected to one another by chain link pins 140 guided in chain sleeves 130. In the new condition of the chain 100, the chain pins 140 have a distance $p_0$ to one another.

To determine the elongation of the chain 100 during operation, the chain elongation monitoring device 200 is positioned perpendicular to the joint axis of the chain 100 to be monitored such that in the new condition of the chain 100, the distance d of the differential transformers 210, 220 to one another corresponds exactly to an integer multiple of the distances $p_0$ between two adjacent chain pins 140 of the chain 100 to be monitored. The first differential transformer 210 and the second differential transformer 220 of the chain elongation monitoring device 200 itself are arranged on a base plate 250. The differential transformers 210, 220 together with the electrical connections are arranged in a housing (not shown) for protection against soiling. The differential transformers 210, 220 are made up of a primary coil and two secondary coils and therefore have three sensor elements. Each of the differential transformers 210, 220 is thus suitable for simultaneously recording measured values over a length range of the chain 100 to be monitored. The length of the length range in the direction of the chain movement is based on the length p, $p_0$ of a chain link of the chain 100 to be monitored and is $p_0$ in this exemplary embodiment. The detection of the measured values by the two differential transformers 210, 220 also takes place simultaneously.

The length $L_0$ of the chain 100 in new condition between the sensors 210, 220 is an integer multiple of the distance $p_0$ between two adjacent chain pins 140 ($L_0$=n*$p_0$), in this exemplary embodiment seven times the distance $p_0$. A chain pin 140 located above the differential transformer 210, 220 is at a distance a, b from the edge (in this and the following exemplary embodiments, the respective left edge) of the differential transformer 210, 220. The chain length $L_0$ is therefore $L_0$=d−($a_0$+$b_0$)=d−2$a_0$=d−2$b_0$ because the distances a, b are the same in the new condition of the chain 100 ($a_0$=$b_0$). Due to a length change $\Delta L$ of the chain 100, the distances a, b are different. The elongation $\Delta L$ of the chain 100 to be monitored is first determined by determining the lengths a and b. Then the following applies to the elongation $\Delta L$ of the chain 100: $\Delta L/L_0$=L−$L_0$/$L_0$=L/$L_0$−1 and DL/Lo= (d−a+b)/(d−$a_o$+$b_o$)−1=(b−$b_o$+a−$a_o$)/(d+$b_o$−$a_o$)

Differential transformer A 210 generates the phase shifts A sin and A cos, differential transformer B 220 generates the phase shifts B sin and B cos. The following then applies to the distances a, b of the chain 100 in the actual condition: a=arctan (A sin/A cos), b=arctan (B sin/B cos). The elongation $\Delta L$ of the chain 100 then results from the phase shifts that the two differential transformers A, B 210, 220 detect: $\Delta L$/Lo=(arctan (B sin/B cos)−arctan (A sin/A cos))/d.

To determine 1 the elongation of the chain 100 and its segments, a first signal is detected 2 by means of the first differential transformer A 210. Simultaneously, a second signal is detected 4 by means of the second differential transformer B 220. The position of a first chain component is then determined 3 from the first signal, and the position of a second chain component is also determined 5 simultaneously from the second signal. In this exemplary embodiment, the two chain components are chain pins 140. Then the distance between the two chain pins 140 is determined according to $\Delta L$/Lo=(arctan (B sin/B cos)−arctan (A sin/A cos))/d.

Advantageously, the first and second signals are continuously detected 2, 4, and the positions of the first and second chain components are also continuously determined 3, 5. The detections 2, 4 and determinations 3, 5 in particular also take place with a stationary chain 100, a minimum speed of the chain 100 is thus not necessary to operate the chain elongation monitoring device 200.

Figure 2A:
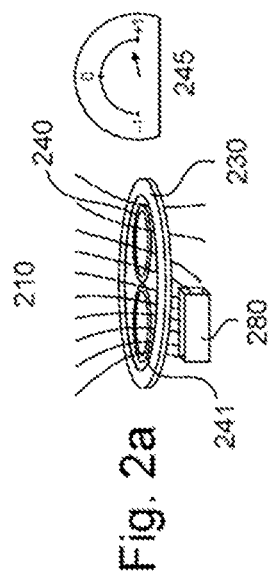
FIGS. 2 a-c show the functional principle of a differential transformer with a magnetic chain element FIGS. 3 a-c show the functional principle of a differential transformer with an electrically conductive chain element
Figure 2B:
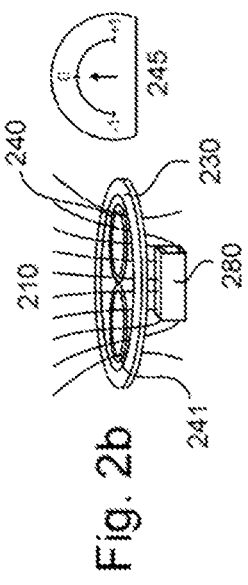
Figure 2C:
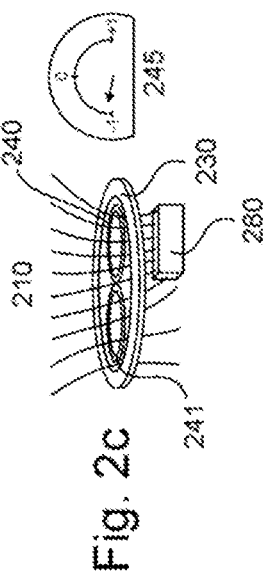

The functional principle of the differential transformers A, B 210, 220 is shown in FIG. 2 upon the detection of a ferromagnetic body 280 and in FIG. 3 upon the detection of an electrically conductive body 290. In this exemplary embodiment, the principle is illustrated on the basis of the sensor A 210; this applies similarly to the second sensor B 220. The sensor 210 has a primary coil 230 and two symmetrically arranged secondary coils 240, 241. An AC voltage having a constant frequency and amplitude is applied to the primary coil 230. An electromagnetic alternating field is generated via the primary coil 230, which induces a respective opposite voltage U cos and U sin in each of the secondary coils 240 located therein. With the same position, the amplitudes of the voltages also change over the distance of the object from the secondary coils 240, 241. The secondary coils 240, 241 are connected in series in phase opposition, as a result of which the voltages at their connections subtract from each other. The resulting voltage is exactly zero when the two coils of the sensor 210 are each constructed symmetrically. If the symmetry is disturbed, an output voltage results, the phase of which in relation to the primary voltage indicates the direction and the value of which indicates the size of the asymmetry. This is achieved by forming the arctan=K*U sin/K*U cos. However, since the object disturbing the symmetry is always at the same distance from the two secondary coils in a first approximation, the factor K is canceled out of the equation and what remains is the ratio of the induced voltages U sin/U cos, which represents the position of the object disturbing the symmetry. The symmetry of the sensor 210 is disturbed here by the passage of a chain component 280, 290. A ferromagnetic chain component 280 (FIG. 2) disturbs the magnetic field lines such that they are closer together, so that the magnetic field at and around the chain component 280 is amplified. The asymmetry generated by the chain component 280 is greatest when the chain component 280 is arranged in the region of the sensor 210 at the edges of the sensor 210 (FIGS. 2a, 2c), i.e., is moved out of or into the sensor region. The sensor 210 then generates a maximum output voltage U=+1 (FIG. 2a), shown schematically on the display 245, when the chain component 280 is positioned at the left edge of the sensor 210, and an output voltage U=−1 when the chain component 280 is positioned at the right edge of the sensor 210 (FIG. 2c). The asymmetry and the resulting output voltage generated by the sensor 210 is U=0 when the chain component 280 is positioned in the middle of the sensor 210 (FIG. 2b). An electrically conductive chain component 290 (FIG. 3) disturbs the magnetic field lines in such a way that they are further apart, so that the magnetic field at and around the chain component 280 is reduced. The asymmetry generated by the chain component 290 is greatest when the chain component 280 is arranged in the region of the sensor 210 at the edges of the sensor 210 (FIGS. 3a, 3c), i.e., is moved out of or into the sensor region. The sensor 210 then generates a maximum output voltage U=−1 (FIG. 3a), shown schematically on the display 245, when the chain component 290 is positioned at the left edge of the sensor 210, and an output voltage U=+1 when the chain component 290 is positioned at the right edge of the sensor 210 (FIG. 3c). The asymmetry and the resulting output voltage generated by the sensor 210 is U=0 when the chain component 290 is positioned in the middle of the sensor 210 (FIG. 3b).

Figure 4:
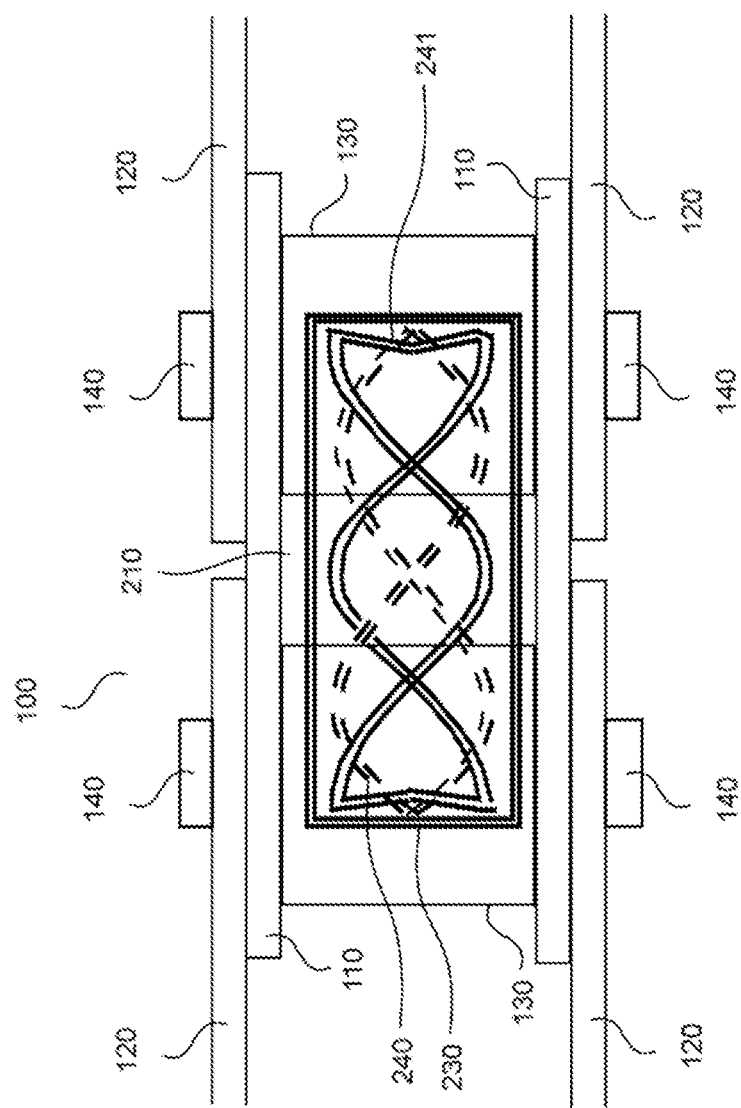
FIG. 4: shows a top view of a differential transformer and a representation of the functional principle

FIG. 4 shows a top view of a sensor A 210 for detecting the position of a chain link. The chain 100 to be monitored has alternating inner and outer side parts, which are connected to one another by chain link pins 140 guided in chain sleeves. The chain pins 140 have the distance p to one another. The sensor 210 has a primary coil 230 and two symmetrically arranged secondary coils 240, 241. An AC voltage having constant frequency and amplitude is applied to the primary coil 230. An electromagnetic field is generated via the primary coil 230, which induces a voltage U cos and U sin oriented opposite in each of the secondary coils 240, 241 located therein. The resulting voltage when the object is not present is zero since the induced voltages are in the form of an 8 and the current-carrying areas cancel each other out.

Figure 5:
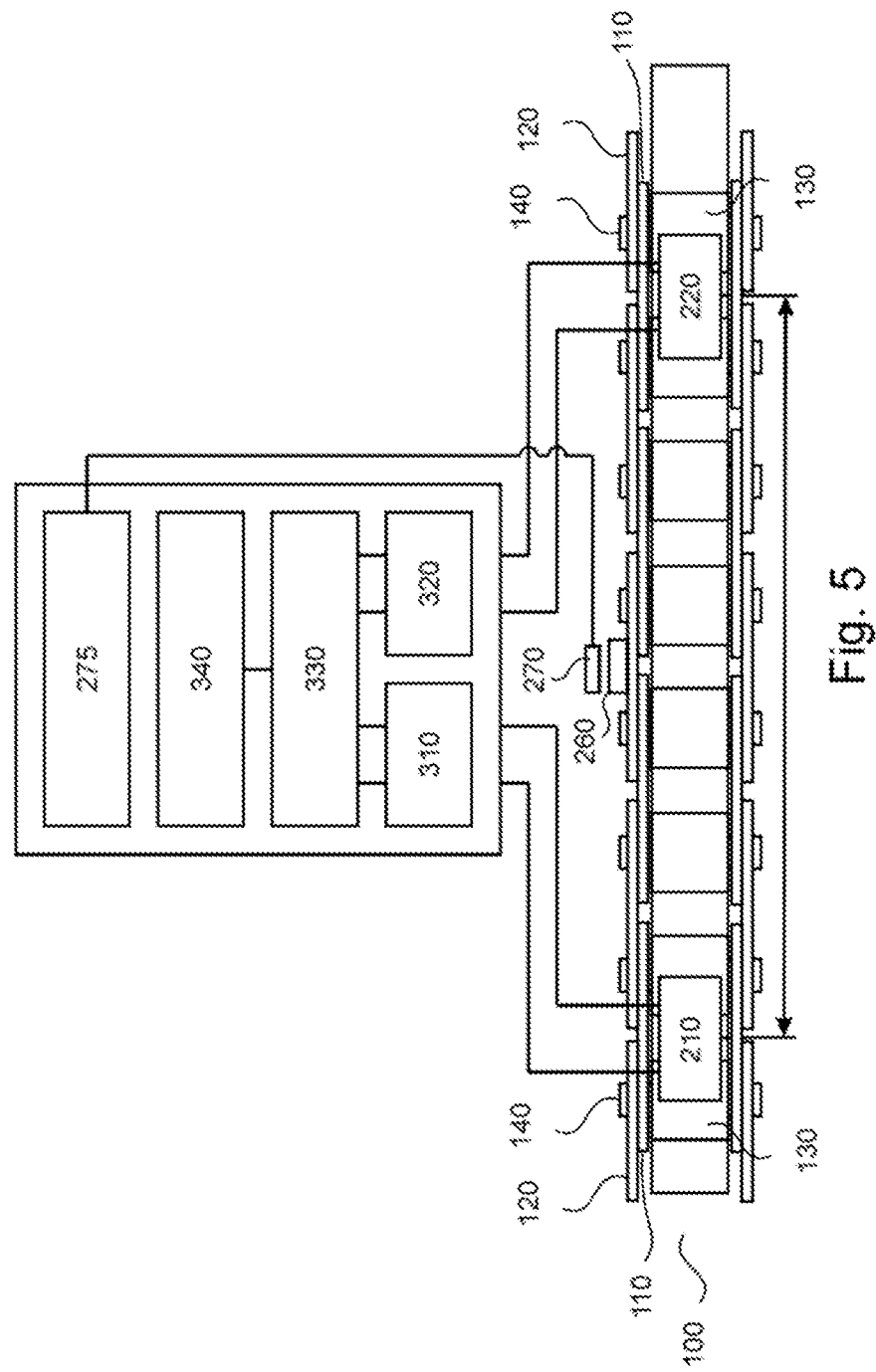
FIG. 5: shows a chain elongation monitoring device according to the invention and a schematic representation of the evaluation circuit

FIG. 5 shows a top view of a further exemplary embodiment of the sensor device 200 according to the invention having an evaluation circuit 310, 320. The sensors A, B 210, 220 are also positioned in such a way that in the new condition of the chain 100, the distance d between the sensors 210, 220 corresponds exactly to an integer multiple of the distances p0 between two adjacent chain pins 140 of the chain 100 to be monitored. As in the previous exemplary embodiments, the sensors 210, 220 can be designed as inductively operating differential transformers, using which the position of chain components is determined. However, the sensors 210, 220 can also be optical or magnetic sensors or a combination of the types of sensors mentioned. The sensors 210, 220 are each connected to an evaluation circuit 310, 320. The evaluation circuits 310, 320 supply the detected measured values to an A/D converter 330, in which the analog measured values are converted into digital values in order to be stored on the microcontroller 340.

Figure 6:
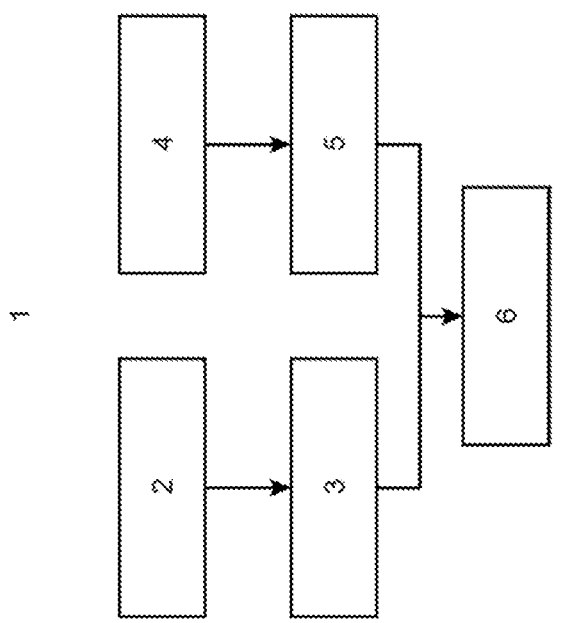
FIG. 6: shows a method according to the invention for determining the elongation of chains

In this exemplary embodiment, a permanent magnet 260 is arranged on chain 100, the position of which is detected by means of a Hall sensor 270. This embodiment is particularly useful when the chain 100 is made of diamagnetic materials, such as stainless steel. The microcontroller connected to the Hall sensor 270 registers the number of passes through the permanent magnet 260 and thus allows conclusions to be drawn about the wear rate of the chain 100. Alternatively, a single component of the chain 100 can be made of a magnetic material. The geometry of the chain 100 is then not changed. An exemplary embodiment of the method 1 according to the invention for determining the elongation of chains 100 is shown in FIG. 6.

The method 1 begins with the detection of a first signal 2 of the first differential transformer 210 and the determination 3 of the position of a first chain component by means of the first signal. Simultaneously, a second signal is detected 4 by the second differential transformer B 220 and the position of a second chain component, which is structurally identical to the first chain component, is determined by means of the second signal 5. A first 210 and second sensor 220 have a defined distance d to one another, which corresponds to an integer multiple of the pitch $p_0$ of the chain 100. In the next step 6, the distance between the chain components is determined 5 from the detected measured values and the length of the chain 100. The wear-related elongation of the chain 100 is determined by relating the determined length of the chain 100 to the length of the chain 100 in the new condition.

Figure 7:
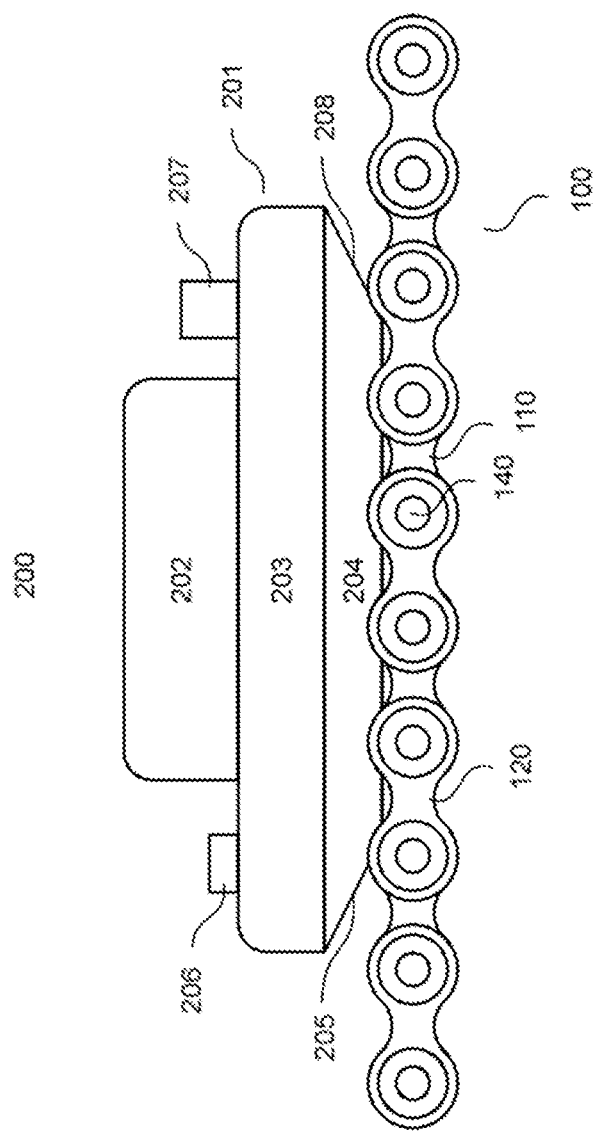
FIG. 7: shows a side view of the chain elongation monitoring device according to the invention

FIG. 7 shows a side view of an exemplary embodiment of the chain elongation monitoring device 200 according to the invention, mounted ready for use for monitoring the elongation ΔL of the chain 100 to be monitored. The chain 100 to be monitored is designed as a roller chain and has alternating inner 110 and outer side parts 120, which are connected to one another by chain link pins 140 guided in chain sleeves 130. To protect against contamination, the chain elongation monitoring device 200 has a housing 201 in which the components first differential transformer 210, second differential transformer 220, additional position detection sensor 270, control unit 340, circuit board having first evaluation circuit 310 and second evaluation circuit 320, and base plate 250 are arranged. The housing 201 itself has the upper housing part 202 and the lower housing part 203, both of which are firmly connected to one another, for example by means of a clip fastener. The housing 201 also has a power connection 207 and a connection for a data line 208. The guide surface 204 is the region of the chain length monitoring device 200 which has the smallest distance to the chain 100. At the opposite ends, the guide surface 204 has the phase surfaces 205, 206 which are inclined in relation to the guide surface 204.

A view of the ready-to-use installed chain elongation monitoring device 200 along the chain running direction is shown in FIG. 8. The chain 100 to be monitored is designed as a roller chain and has alternating inner 110 and outer side parts 120, which are connected to one another by chain link pins 140 guided in chain sleeves 130. The chain elongation monitoring device 200 has the housing 201 in which the components are arranged. A first evaluation circuit 310 and a second evaluation circuit 320 are arranged on the circuit board 209 (FIG. 8a). The chain elongation monitoring device is divided into an upper housing part 202, which accommodates the connections and the circuit board 209, and a lower housing part 203, which accommodates the sensor elements 210, 220 and has the guide surface 204. The sensor elements 210, 220 are arranged far enough into the lower region 203b of the lower housing part 203 that their upper edge is still below half the height of the lower housing part 203. The lower housing part 203 in turn is also divided. The upper region 203a of the lower housing part 203 comprises the fastening elements for fastening the lower housing part 203 to the upper housing part 202 and has the same width as the upper housing part 202, while the lower region 203b of the lower housing part 203 having the guide surface 204 is formed narrower than the upper housing part 202 or the upper region 203a of the lower housing part 203.

The chain elongation monitoring device 200 is fastened in such a way that the guide surface 204 is at a distance of 0.2 mm from a chain sleeve 130 of the chain 100. In the region that is arranged between the side parts 120 of the chain 100, the guide surface 204 has a width $b_F$ that is less than the width $b_K$ of the chain 100 between the side parts 120. The differential transformers 210, 220 are arranged close to the guide surface 204 in such a way that they are at the smallest possible distance from the chain 100 (FIG. 8b).

Figure 9:
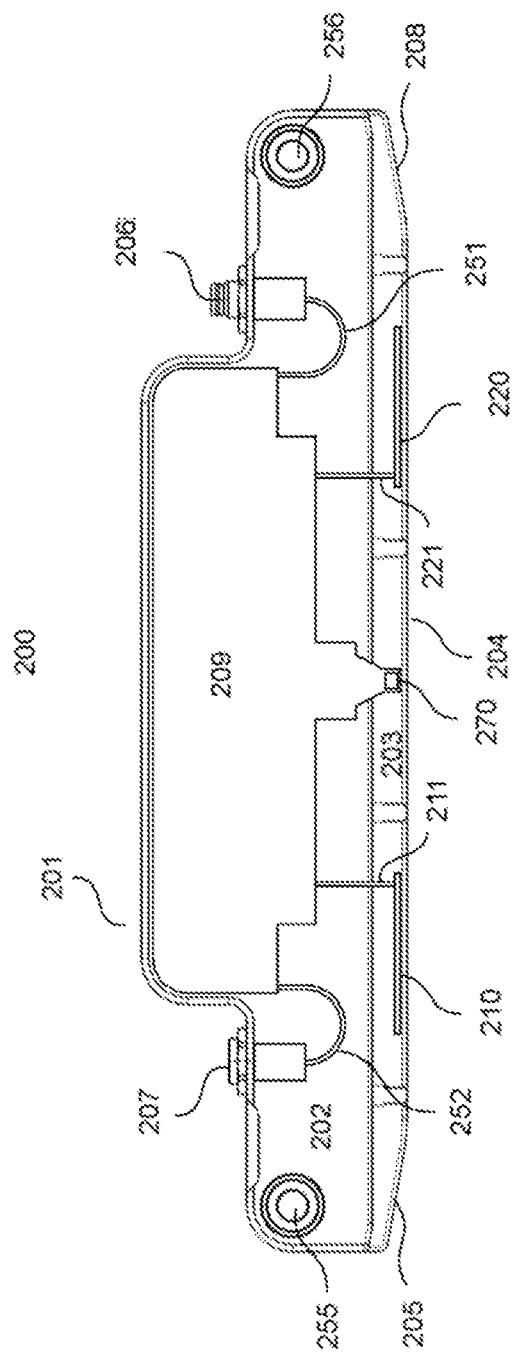
FIG. 9: shows a side sectional view of the chain elongation monitoring device according to the invention

FIG. 9 shows a sectional view of an exemplary embodiment of the chain elongation monitoring device 200 according to the invention. The chain elongation monitoring device 200 has the housing 201 in which the components are arranged. The first evaluation circuit 310 and the second evaluation circuit 320 are arranged on the circuit board 209, the position detection sensor 270 is also arranged directly on the circuit board 209 between the differential transformers 210, 220. The differential transformers 210, 220 are arranged close to the guide surface 204 in such a way that they have the least possible distance to the chain 100 and are connected to the circuit board 209 by means of lines 211, 221. The guide surface 204 delimits the chain elongation monitoring device 200 relative to the chain 100 and has phase surfaces 205, 208 on the end faces. The circuit board 209 is connected via lines 251, 252 to connections for the power supply 206 and the data line 207. The chain elongation monitoring device 200 is fastenable by means of the fastening openings 255, 256.

LIST OF REFERENCE NUMERALS 1 method for determining the elongation of chains
2 detecting a first signal from the first differential transformer
3 determining the position of a first chain component
4 detecting a second signal from the second differential transformer 5 determining the position of a second chain component
6 determining the distance between the first chain component and the second chain component
100 chain
110 chain inner link
120 chain outer link
130 chain sleeve
140 chain pin
200 chain elongation monitoring device
201 housing
202 upper housing part
203 lower housing part
203a lower housing part upper region
203b lower housing part lower region
204 guide surface
205 first phase surface
206 power connection
207 connection for data line
208 second phase surface
209 circuit board
210 differential transformer A
211 mount
220 differential transformer B
221 mount
230 primary coil
240 secondary coil
250 base plate
251 power line
252 data line
255, 256 fastening
260 permanent magnet
270 Hall sensor/position detection sensor
275 evaluation circuit magnetic sensor
280 ferromagnetic body
290 non-magnetic body
310 first evaluation circuit
320 second evaluation circuit
330 A/D converter
340 microcontroller/control unit
$b_K$ wide chain between the inner plates
$b_F$ wide guide surface
$\Delta L$ elongation of the chain
L length of chain between differential transformer A, differential transformer B, actual condition
$L_0$ length of chain between differential transformer A, differential transformer B, in new condition
p0 pitch (distance between two adjacent chain pins) in new condition
p pitch (distance between two adjacent chain pins), actual condition
d distance of the differential transformers
a distance from chain pin to edge of differential transformer A, actual condition
b distance from chain pin to edge of differential transformer B, actual condition
$a_0$ distance from chain pin to edge of differential transformer A, new condition
$b_0$ distance from chain pin to edge of differential transformer B, new condition

We claim:

1. A chain elongation monitoring device (200) comprising
a first differential transformer (210),
a second differential transformer (220),
a control (340) for recording the measured values,
wherein the second differential transformer (220) is arranged at a fixed distance from the first differential transformer (210).

2. The chain elongation monitoring device (200) according to claim 1
characterized in that
the length of the first (210) and/or the second differential transformer (220) corresponds at least to the distance between the first (210) and second differential transformer (220).

3. The chain elongation monitoring device (200) according to claim 1
characterized in that
the chain elongation monitoring device (200) has a circuit board having a control unit (340).

4. The chain elongation monitoring device (200) according to claim 1
characterized in that
the chain elongation monitoring device (200) has a further position detection sensor (270) in addition to the first (210) and second differential transformer (220).

5. The chain elongation monitoring device (200) according to claim 4
characterized in that
the additional position detection sensor (270) is based on a different technology than the two differential transformers (210, 220).

6. The chain elongation monitoring device (200) according to claim 4
characterized in that
the position detection sensor (270) has a lower resolution than the differential transformers (210, 220).

7. The chain elongation monitoring device (200) according to claim 4
characterized in that
the position detection sensor (270) is arranged between the first (210) and second differential transformer (220).

8. The chain elongation monitoring device (200) according to claim 4
characterized in that
the position detection sensor (270) is arranged directly on a circuit board (209).

9. The chain elongation monitoring device (200) according to claim 1
characterized in that
the distance corresponds to at least the length of a differential transformer (210, 220).

10. The chain elongation monitoring device (200) according to claim 1
characterized in that
the components, first differential transformer (210), second differential transformer (220), and control unit (340) are arranged in a housing (201).

11. The chain elongation monitoring device (200) according to claim 1
characterized in that
the chain elongation monitoring device (200) has a first guide surface (204).

12. The chain elongation monitoring device (200) according to claim 11
characterized in that
the length LF of the first guide surface (204) is greater than the length of one of the differential transformers (210, 220), preferably longer than the sum of the lengths of both differential transformers (210, 220), and particularly preferably greater than three times the length of one of the differential transformers (210, 220).

13. The chain elongation monitoring device (200) according to claim 11
characterized in that
a first phase surface (205) adjoins the first end of the first guide surface (204) in the chain running direction.

14. The chain elongation monitoring device (200) according to claim 13
characterized in that
a second phase surface (206) adjoins the second end of the first guide surface (204) in the chain running direction.

15. The chain elongation monitoring device (200) according to claim 1
characterized in that
the chain elongation monitoring device (200) has a guide element.

16. The chain elongation monitoring device (200) according to claim 15
characterized in that
the guide element is arranged opposite to the guide surface.

17. The chain elongation monitoring device (200) according to claim 15
characterized in that
the guide element has a second guide surface.

18. The chain elongation monitoring device (200) according to claim 17
characterized in that
the length LF2 of the second guide surface is greater than the length of one of the differential transformers (210, 220), preferably longer than the sum of the lengths of both differential transformers (210, 220), and particularly preferably greater than three times the length of one of the differential transformers (210, 220).

19. The chain elongation monitoring device (200) according to claim 17
characterized in that
a third phase surface adjoins the first end of the second guide surface in the chain running direction.

20. The chain elongation monitoring device (200) according to claim 17
characterized in that
a fourth phase surface adjoins the second end of the second guide surface in the chain running direction.

21. A method (1) for determining the elongation of segments of a chain (100) during operation, which has the following steps:
detecting a first signal from a first differential transformer (210),
determining the position of a first chain component of a chain (100) from the first signal,
detecting a second signal from a second differential transformer (220) determining the position of a second chain component of a chain (100) from the second signal,
determining the distance between the first and the second chain component.

22. The method (1) for determining the elongation of segments of a chain (100) during operation according to claim 21
characterized in that
the first signal and the second signal are detected simultaneously.

23. The method (1) for determining the elongation of segments of a chain (100) during operation according to claim 21
characterized in that
the first differential transformer (210) and the second differential transformer (220) have a known distance, wherein the distance is a parameter for calculating the length value of the chain (100).

24. The method (1) for determining the elongation of segments of a chain (100) during operation according to claim 21
characterized in that
the detected chain components are standard chain components.

25. The method (1) for determining the elongation of segments of a chain (100) during operation according to claim 24
characterized in that
the detected chain components are the pins (140) and/or the sleeves (130) of the chain (100).

26. The method (1) for determining the elongation of segments of a chain (100) during operation according to claim 24
characterized in that
all structurally identical chain components, among the detected chain components, which are guided past a differential transformer (210, 220) are detected.

27. The method (1) for determining the elongation of segments of a chain (100) during operation according to claim 21
characterized in that
the first signal and the second signal are detected simultaneously.

28. The method (1) for determining the elongation of segments of a chain (100) during operation according to claim 21
characterized in that
the length between the first chain component and the chain component of the same type directly adjacent to the first chain component is determined from the first signal and the second signal.

29. The method (1) for determining the elongation of segments of a chain (100) during operation according to claim 21
characterized in that
the position of the first chain component is determined exclusively from the signals detected from the first differential transformer (210) and/or the position of the second chain component is determined exclusively from the signals detected from the second differential transformer (220).

* * * * *